United States Patent Office 3,033,844
Patented May 8, 1962

3,033,844
POLYMERIZATION PROCESS AND CATALYSTS
Edwin F. Peters, Lansing, and Bernard L. Evering, Chicago, Ill., assignors to Standard Oil Company, Chicago, Ill., a corporation of Indiana
No Drawing. Filed July 28, 1958, Ser. No. 751,188
18 Claims. (Cl. 260—93.7)

This invention relates to a process for the conversion of 1-alkenes to polymers by exposure under polymerization conditions to novel catalysts. In one aspect, this invention relates to the conversion of charging stocks comprising as an essential component at least one normal terminal mono-olefin to normally solid polymers or copolymers, having the characteristics of tough resins, by exposure of said charging stock under suitable conditions to novel multi-component catalysts. In one aspect our invention is concerned with new modified vanadium oxide catalysts which represent a substantial improvement over previously known vanadium oxide catalysts used in the polymerization of 1-alkenes.

One object of our invention is to provide novel combinations of catalysts which are useful for the conversion of 1-alkenes to polymers, especially for the conversion of charging stocks comprising normal 1-alkenes having 2 to 4 carbon atoms, inclusive, per molecule to polymers which are normally solid or tough resinous materials. Another object is to provide novel combinations of catalysts and a low temperature, low pressure process for the conversion of ethylene and/or propylene-containing charging stocks to high molecular weight resinous materials. An additional object is to provide processes and catalysts for the conversion of ethylene or propylene to relatively crystalline high polymers. These and additional objects of our invention will become apparent from the following description of our invention.

Briefly, the process of the present invention involves exposing a 1-alkene under polymerization conditions to contact with a catalyst derived from the interaction of a hydrocarbon aluminum compound and an oxide of vanadium promoted by the addition of a minor proportion, on a molar basis, of at least an oxide of a metal selected from the group consisting of chromium, iron, cobalt, nickel and zirconium. The promoting metal oxide is incorporated with the vanadium oxide in a proportion between about 1 and about 20 molar percent, based on the molar concentration of vanadium oxide in the catalyst. We prefer to use the promoting oxide in the concentration between about 1 and about 10 mol percent, usually about 3 to about 5 mol percent, based on vanadium oxide. Usually, larger proportions than about 10 mol percent of the promoting metal oxide are not required. The hydrocarbon aluminum compound comprises at least one monovalent hydrocarbon radical joined to the aluminum atom and may contain up to 3 hydrocarbon-aluminum linkages, for example as in the class of trialkyl aluminum compounds. The polymerization is usually effected at temperatures within the range of about 0° C. to about 230° C., although somewhat higher or lower temperatures can be used in some instances. Generally we prefer polymerization temperatures of 50 to 125° C. The polymerization of copolymerization of 1-alkene with a suitable comonomer is preferably effected in a substantially inert liquid reaction medium, for example a non-polymerizing liquid or liquefied hydrocarbon or hydrocarbon derivative. Pressure is in general not a critical variable in the process of this invention and it can be broadly varied, for example over the range of less than one atmosphere to 30,000 p.s.i.g. or even more, although usually the range of pressure is between about 50 and about 2000 p.s.i.g. Routine selection and adjustment of polymerization pressures can be made to maximize polymerization rate, to effect saturation of the liquid polymerization reaction medium with a normally gaseous 1-alkene feed stock, to maintain a relatively volatile liquid reaction medium in the liquid condition at an elevated temperature, etc. Both the process and catalysts of our invention will be described in detail hereinafter.

Novel catalysts are employed in effecting the process of this invention. These catalysts are made from at least three components, usually from four components. The components usually involved in the preparation of our novel catalysts are:

(1) A hydrocarbon aluminum compound
(2) An oxide of vanadium
(3) A specified promoting metal oxide or oxides and, preferably,
(4) An inert supporting material for the oxide of vanadim and promoting metal oxide.

We may consider first the hydrocarbon aluminum compound. The hydrocarbon aluminum compound can be selected from the class of trihydrocarbon aluminum compounds, dihydrocarbon aluminum hydrides, hydrocarbon aluminum di-hydrides, hydrocarbon aluminum di-halides, dihydrocarbon aluminum halides or their mixtures (aluminum sesquihalides); hydrocarbon aluminum compounds having the general formula $R_2AlX$ wherein R is a monovalent hydrocarbon radical and X is a negative radical such as an alkoxy group, an aryloxy group, a secondary amino group, a secondary amido group, a mercapto group (RS—), a carboxy or sulfonyl group or the like. The hydrocarbon aluminum compound comprises at least one monovalent hydrocarbon radical joined directly to the aluminum atom. In general we prefer to employ trihydrocarbon aluminum compounds having the general formula

wherein $R_1$, $R_2$ and $R_3$ are the same or different monovalent hydrocarbon radicals such as alkyl, cycloalkyl-alkyl, cycloalkenyl-alkyl, aryl-alkyl, cycloalkyl, alkyl-cycloalkyl, aryl-cycloalkyl, cycloalkyl alkenyl, alkyl-aryl or cycloakyl-aryl radicals.

Specific exampes of R groups for substitution in the above formula include methyl, ethyl, n-propyl, isopropyl, isobutyl, n-amyl, isoamyl, hexyl, n-octyl, n-dodecyl, and the like; 2-butenyl, 2-methyl-2-butenyl and the like; cyclopentyl-methyl, cyclohexyl-ethyl, cyclopentyl-ethyl, methylcyclopentyl-ethyl, 4-cyclohexenylethyl and the like; 2-phenylethyl, 2-phenylpropyl, β-naphthylethyl, methylnaphthylethyl, and the like; cyclopentyl, cyclohexyl, 2,2,1-bicycloheptyl, and the like; methylcyclopentyl, dimethylcyclopentyl, ethylcyclopentyl, methylcyclohexyl, dimethylcyclohexyl, ethylcyclohexyl, isopropylcyclohexyl, 5-cyclopentadienyl and the like; phenylcyclopentyl, phenylcyclohexyl, the corresponding naphthyl derivatives of cycloalkyl groups, and the like; phenyl, tolyl, xylyl, ethylphenyl, xenyl, naphthyl, methylnaphthyl, dimethylnaphthyl, ethylnaphthyl, cyclohexylphenyl and other $AlR_3$ compounds of the type disclosed and suggested in German Patent 878,560.

In lieu of trihydrocarbon aluminum compounds, use can be made of dihydrocarbon aluminum hydrides, the hydrocarbon aluminum sesquihalides, etc. containing at least one monovalent hydrocarbon radical, such as has been generally and specifically disclosed above.

The second component used in the preparation of our catalysts is an oxide of vanadium, preferably $V_2O_5$ although the lower oxides such as $VO_2$, $V_2O_3$ or $VO$ may be employed. Even when $V_2O_5$ is employed in the preparation of the catalyst it is at least partially reduced to a lower average valence state than 5. The catalytic activity of the vanadium oxide is maximized by maximum exposure of its surface to interaction with the other catalyst components, particularly the hydrocarbon aluminum compound and to the polymerization reaction mixture. It is therefore desirable to extend or attenuate the vanadium oxide upon a suitable substantially inert catalyst support, preferably in particulate form and characterized by a surface area of at least about 100 square meters per gram, as determined by a conventional method. Particular supports for vanadia which come into consideration are various forms of silica or other difficultly reducible, substantially inert metal oxides such as alumina, synthetic aluminosilicates, acid-activated montmorillonite, synthetic silica-alumina composites, magnesia, titania or the like. Other supports which can be considered are kaolin, iron oxide pigments, activated carbon and even inert supports of relatively low surface area such as tabular alumina, various fused silicates, silicon carbide, diatomaceous earth or the like. In general, it is preferable to employ high surface area supports which are difficultly reducible metal oxides and of these, it is preferred to use relatively macroporous supports which can be produced by conventional methods such as by treatment with steam and air at elevated temperatures. We have obtained excellent results with commercial silica of high surface area having an average pore diameter of approximately 140 A. units.

The oxide of vanadium can be incorporated in the catalyst support in any known manner, for example, by impregnation, coprecipitation with the support, co-gelling with the support, absorption upon the support or other known methods, a review of which is available in "Catalysis" edited by Dr. Paul H. Emmett (published by Reinhold Publishing Corp, New York ( 1954), vol. 1, pages 328–9).

The concentration of the oxide of vanadium in the supported catalyst can range from about 1 to about 50% by weight but there is usually no advantage in employing concentrations of vanadium oxides in excess of about 10 or 20% by weight of the total catalyst. Usually between about 3 and about 10% by weight of an oxide of vanadium, based on the total weight of the supported catalyst, can be used to good effect.

The concentration of the promoting metal oxide, based on the oxide of vanadium, can range from about 1 to about 20 mol percent; even higher concentrations of the promoting metal oxide can be used without gaining any economic or technical advantage. Usually the concentration of promoting metal oxide is selected within the range of about 2 to about 10 mol percent, preferably about 3 to 5 mol percent, inclusive, based on the oxide of vanadium which is present in the catalyst.

Any suitable method can be employed to incorporate the promoting metal oxide in the vanadium oxide catalyst, for example by ball milling or otherwise mechanically contacting the vanadium oxide catalyst with a fine powder of the promoting oxide; by absorbing a compound of the promoting element in the vanadia catalyst and thereafter converting to an oxide; by simultaneously absorbing compounds of promoting element and vanadium on the support and converting to oxides, e.g. absorption of ammonium vanadate and the nitrate of a promoting metal on a catalyst support such as high surface silica followed by calcination to convert the nitrates to oxides; by any other suitable method heretofore employed for the preparation of mixed metal oxide catalysts.

It is highly desirable that the vanadium oxide catalyst containing the promoting oxide be in essentially dry state prior to contact with the hydrocarbon aluminum compound in order to maximize the catalytic activity and to avert wastage of the hydrocarbon aluminum compound co-catalyst which can react with free and bound water in the vanadium oxide catalyst. It is, therefore, desirable to subject the promoted vanadium oxide catalyst to elevated temperatures under suitable drying conditions before contact with the hydrocarbon aluminum compound, for example at elevated temperatures between about 125 and about 700° C. while subjecting the catalyst to a partial vacuum of the order of 10 millimeters of mercury or less or by flowing a dry gas stream such as air over the catalyst at elevated temperatures within the above range, for example at about 500° C., or by methods producing equivalent drying of the vanadium oxide catalyst.

In order to maximize the catalyst activity and reduce the requirements of the hydrocarbon aluminum compound co-catalysts, it may be desired to effect partial reduction of catalysts comprising an oxide of vanadium before use in the polymerization process. The partial reduction and conditioning treatment of the oxide catalyst is preferably effected with hydrogen although other reducing agents such as carbon monoxide, mixtures of hydrogen and carbon monoxide (water gas, synthesis gas, etc.), sulfur dioxide, hydrogen sulfide, dehydrogenatable hydrocarbons, etc. may be employed. Hydrogen can be employed as a reducing agent at temperatures between about 350° C. and about 850° C., although it is more often employed at temperatures within the range of 450° C. to 650° C. The hydrogen partial pressure in the reduction or conditioning operation can be varied from sub-atmospheric pressures, for example even 0.1 pound (absolute), to relatively high pressures up to 3000 p.s.i.g., or even more. The simplest reducing operation may be effected with hydrogen at about atmospheric pressure.

Reducing gases such as carbon monoxide and sulfur dioxide may be used under substantially the same conditions as hydrogen. Dehydrogenatable hydrocarbons are usually employed at temperatures of at least about 450° C. and not above 850° C. Examples of dehydrogenatable hydrocarbons are acetylene, methane and other normally gaseous paraffin hydrocarbons, normally liquid saturated hydrocarbons, aromatic hydrocarbons such as benzene, toluene, xylenes and the like, normally solid polymethylenes, polyethylenes or paraffin waxes, and the like.

The catalyst of our invention is prepared by the interaction of the hydrocarbon aluminum compound with the promoted vanadium oxide catalyst, preferably in an inert liquid medium such as the liquid medium in which the polymerization is effected. The liquid medium serves as a suitable means for effecting contact of the hydrocarbon aluminum compound with the oxide catalyst, for example by stirring the powdered vanadium oxide catalyst with the hydrocarbon aluminum compound in the liquid reaction medium while suitably controlling the temperature within desired limits. Interaction can be effected between the hydrocarbon aluminum compound and the vanadium oxide catalyst in molar ratios between about 0.1 and about 100, based on molar concentration of vanadium oxide in the catalyst. The molar ratio of the hydrocarbon aluminum compound to vanadium oxide is usually not critical and can be varied over a broad range. Usually we employ molar ratios of hydrocarbon aluminum compound to vanadium oxide between about 1 and about 10, preferably about 2 and 6, for propylene polymerization and ratios to 50 or even higher for ethylene polymerization, although it will be recognized that this preference can be markedly affected by the presence of adventitious impurities in the polymerization system which are capable of reacting with the hydrocarbon aluminum compound, by the desired rate of reaction, by the specific identity of the hydrocarbon aluminum compound and its relative capacity for reduction, etc.

The interaction between the hydrocarbon aluminum compound and promoted vanadium oxide catalyst can be effected at temperatures within the range of about −50° C. to about 165° C.; usually it is convenient to employ temperatures in the range of about 0 to 100° C. and more often, between about 20° C. and about 75° C.

The aforesaid interaction can be effected in the absence of olefins or other unsaturated compounds, for example in a vessel devoted to this purpose, then discharging the contents of said vessel as a slurry of preformed catalyst into the olefin polymerization reaction. Alternatively, the catalyst can be prepared by interaction of the hydrocarbon aluminum compound with the promoted vanadium oxide in the presence of the olefinic charging stock, for example in the polymerization reactor, following which operating conditions are adjusted to achieve a suitable rate of polymerization and further quantities of the olefinic feed stock are charged.

The catalyst of this invention can be used to advantage in the polymerization of 1-alkenes, particularly those containing from 2 to 8 carbon atoms, inclusive, per molecule and especially those which have either normal structure or are isoalkyl ethylenes, for example, 3-methylbutene (isopropylethylene). Thus, suitable feed stocks comprise ethylene, propylene, 1-butene, 1-pentene, 1-heptene, 1-octene, 1-dodecene, 1-tetradecene, 1-hexadecene or their mixtures or the like. Examples of isoalkyl ethylenes which can be used as components of polymerization feed stocks are 3-methylbutene, 4-methylpentene, 5-methylhexene or their mixtures with each other or with normal 1-alkenes, or the like.

The 1-alkene monomers can be polymerized with suitable polymerizable comonomers, for example, aryl ethylenes such as styrene, Ar-halostyrenes, Ar-alkylstyrenes or the like. Other suitable comonomers comprise conjugated dienes such as butadiene, isoprene, chloroprene, piperylene, cyclopentadiene or the like. Other comonomers include tetrafluoroethylene, perfluorovinyl chloride or the like.

Miscellaneous alkene charging stocks which can be polymerized by the process of our invention include norbornylene, 4-vinyl-cyclohexene, vinyl cyclohexene or the like.

The olefin charging stock may contain unreactive diluents such as saturated hydrocarbons of similar or identical boiling range, for example, as in alkenes or their mixtures derived from petroleum refining operations. The alkene charging stock is usually employed in polymerization in solution in a substantially inert liquid reaction medium such as a saturated or aromatic hydrocarbon, in a concentration in the range of about 1 to about 25% by weight of the total solution. Solvents are, however, not in all cases required.

In general, the present process would appear to find its greatest current utility in the conversion of normally gaseous 1-alkenes, alone or with suitable comonomers, to form normally solid waxy or tough, resinous materials suitable for use as commercial plastics, as in the conversion of ethylene to resinous polyethylenes, ethylene-propylene mixtures to form resinous copolymers having densities (24/4° C.) within the range of about 0.92 to 0.97 gram per cc.; propylene to form normally solid, resinous polypropylenes containing both amorphous and crystalline components; 1-butene to form waxy-to-resinous polymers; ethylene-1-butene mixtures to form normally solid copolymers and the like The processes of catalyst activation by the interaction of hydrocarbon aluminum compound and oxide of vanadium and/or polymerization of alkene can be effected in suitable liquid reaction media such as various saturated hydrocarbons, aromatic hydrocarbons, relatively unreactive alkenes (containing a non-terminal double bond) and cycloalkenes, perfluorocarbons, chloro-aromatics; various ethers such as ethyl ether, tetrahydrofuran, 1,4-dioxane, dioxolanes and the like, or mixtures of suitable liquids.

Temperature control during the course of the polymerization process can readily be accomplished owing to the presence in the reaction zone of a large liquid mass having relatively high heat capacity. The liquid hydrocarbon reaction medium can be cooled by heat exchange inside or outside the reaction zone.

It is desirable to minimize or avoid the introduction of water, oxygen, carbon dioxide or sulfur compounds into contact with the catalyst or co-catalyst. Any known means may be employed to purify the olefinic charging stocks of these materials prior to their introduction into the polymerization reactor.

The contact time or space velocity employed in the polymerization process will be selected with reference to the other process variables, catalysts, the specific type of product desired and the extent of olefin conversion desired in any given run or pass over the catalyst. In general, this variable is readily adjustable to obtain the desired results. In operations in which the olefin charging stock is caused to flow continuously into and out of contact with the solid catalyst, suitable liquid hourly space velocities are usually between about 0.1 and about 10 volumes, preferably about 0.5 to 5 or about 2 volumes of olefin solution in a liquid reaction medium. The amount of olefin in such solutions may be in the range of about 2 to 50% by weight, preferably about 2 to about 10 weight percent or, for example, about 5 to 10 weight percent.

The following specific examples are illustrations of our invention which should not be interpreted as an undue limitation thereof.

All the runs in Table 1, below, were made with a dry, deoxygenated, decarbonated propylene feed stock in stainless steel autoclaves of 250 ml. capacity provided with a stirrup-type stirrer (Magne-Dash reactors) at 85° C. in two-hour reaction periods. In each instance the autoclave was charged under a blanket of inert gas with 70 cc. of pure, dry n-heptane or mineral spirits (sulfuric acid-treated naphtha consisting essentially of alkanes, boiling range 168 to 191° C.). A dilute solution of triisobutyl aluminum in n-heptane was charged in the proportion of about 3 mols per mol of $V_2O_5$ in the catalyst; then 3 grams of a catalyst of 7.5 w. percent of vanadium oxide supported on a commercial silica gel (Davison Co. 70 gel; average pore diameter 140 A.) containing 5 mol percent (based on calculated $V_2O_5$) of promoting oxide. Before charging to the reactor, the oxide catalyst was calcined at 500° C. for a period between about 2 and about 5 hours in air under static conditions. As charged to the reactor the oxide catalysts were off-white powders of 60 to 240 mesh per inch. In each run the reactor was charged last with 60 grams of propylene resulting in an initial pressure at 85° C. of about 450 p.s.i.g. and final pressures usually within the range of about 300 to 350 p.s.i.g.

The vanadia catalyst which served as the standard in the run contained no promoting oxide and under the conditions of the test, yielded 2.8 g. of propylene polymers in two hours. The propylene polymers could be fractionated into relatively grease-like polymers; wax-like, xylene-soluble polymers and resinous, relatively crystalline polypropylenes which are substantially insoluble in xylenes at room temperature.

The "Mixed Oxide System" of Table 1 is a reference to vanadium oxide and promoting metal oxide, ignoring the silica support. The "Activity Ratio" is the yield of total propylene polymers under the standardized operating conditions, relative to the yield obtained with the vanadia-silica catalyst. The "Percent Insoluble" indicates partly crystalline, resinous polypropylenes derived from total product by dissolving in xylene at 125° C. to form solutions containing 3 to 5 grams per liter and cooling to room temperature to produce the xylene-insoluble precipitate; thereafter the mixture is filtered to yield a xylene solution of propylene polymers which is poured into acetone to precipitate the propylene polymers. Evaporation of the solvent yields grease-like polypropylenes.

TABLE 1

*Propylene Polymerization With Modified Vanadia Catalysts*

| Run No. | Mixed Oxide System | Activity Ratio | Percent Insoluble |
|---|---|---|---|
| 1 | $V_2O_5$— | 1 | 46 |
| 2 | $V_2O_5$—nickel oxide | 2.18 | 43 |
| 3 | $V_2O_5$—chromium oxide | 2.10 | 48 |
| 4 | $V_2O_5$—zirconium oxide | 1.98 | 55 |
| 5 | $V_2O_5$—cobalt oxide | 1.76 | 49 |
| 6 | $V_2O_5$—iron oxide | 1.27 | 50 |

The unpredictable effects of the addition of other metal oxides to the vanadium oxide catalyst will be apparent from the data in Table 2, obtained in the same type of equipment and with the same operating conditions as the runs which yielded the data of Table 1.

TABLE 2

*Modified Vanadia Catalysts*

| Run No. | Mixed Oxide System | Activity Ratio | Percent Insoluble |
|---|---|---|---|
| 1 | $V_2O_5$— | 1 | 46 |
| 9 | $V_2O_5$—$Na_2O$ | 0.6 | 48 |
| 10 | $V_2O_5$—$K_2O$ | 1 | 51 |
| 11 | $V_2O_5$—$CuO$ | 1 | 49 |
| 12 | $V_2O_5$—$BaO$ | 0.9 | 52 |
| 13 | $V_2O_5$—$ZnO$ | 0.9 | 51 |
| 14 | $V_2O_5$—$Al_2O_3$ | 0.5 | 50 |

The following are illustrative data concerning ethylene polymerization with the catalysts of this invention. The reactions were carried out in a 250 cc. Magne-Dash reactor. The reactor was first charged with 80 cc. of n-heptane, then triisobutyl aluminum was charged in a molar ratio to the $V_2O_5$ contained in the catalyst of 50, then the solid, vanadia-containing catalyst was charged, following which the reactor was heated to 75° C. in about 20 to 25 minutes. Ethylene was then charged to a pressure of 200 p.s.i. and after 10 minutes, additional ethylene was charged at a pressure increment of 100 p.s.i. per minute in the next 5 minutes until the final pressure of 700 p.s.i. was reached. The reactor contents were then agitated without the further addition of ethylene for 2 hours at 85° C. The following data were obtained.

TABLE 3

| Catalyst | G. | Total Polyethylene | Polymerization Rate, g./g./hr. | Activity Ratio [3] |
|---|---|---|---|---|
| $V_2O_5$—$SiO_2$ [1] | 0.155 | 20.5 | 66 | 1 |
| $V_2O_5$—$ZrO_2$—$SiO_2$ [2] | 0.08 | 13.7 | 92 | 1.4 |

[1] 7.5 wt. percent of $V_2O_5$ on $SiO_2$.
[2] 3.7 mol percent of $ZrO_2$ with respect to $V_2O_5$.
[3] Based on polymerization rate.

The polymers produced by the process of this invention can be subjected to such after-treatment as may be desired to fit them for particular uses or to impart desired properties. Thus, the polymers can be extruded, mechanically milled, filmed or cast, or converted to sponges or latices. Antioxidants, stabilizers, fillers, extenders, plasticizers, pigments, insecticides, fungicides, etc. can be incorporated in the polymers and/or in by-product alkylates or "greases." The polymers may be employed as coating materials, gas barriers, binders, etc. to even a wider extent than polyethylenes made by prior processes.

The polymers produced by the process of the present invention, especially the polymers having high specific viscosities, can be blended with other polyolefins to impart stiffness or flexibility or other desired properties thereto. The solid resinous products produced by the process of the present invention can, likewise, be blended in any desired proportions with hydrocarbon oils, waxes, such as paraffin or petrolatum waxes, with ester waxes, with high molecular weight polybutylenes, and with other organic materials. Small proportions between about .01 and about 1 percent of the various polymers produced by the process of the present invention can be dissolved or dispersed in hydrocarbon lubricating oils to increase V.I. and to decrease oil consumption when the compounded oils are employed in motors. The polymerization products having molecular weights of 50,000 or more, provided by the present invention, can be employed in small proportions to substantially increase the viscosity of fluent liquid hydrocarbon oils and as gelling agents for such oils.

The polymers produced by the present process can be subjected to chemical modifying treatments, such as halogenation, halogenation followed by dehalogenation, sulfohalogenation by treatment with sulfuryl chloride or mixtures of chlorine and sulfur dioxide, sulfonation, and other reactions to which hydrocarbons may be subjected.

The polymers of copolymers produced by our process can be cross-linked or vulcanized by treatment with agencies yielding free radicals, e.g. various peroxides, ultraviolet rays, gamma-rays, etc. This application is a continuation-in-part of an application for United States Letters Patent Serial No. 493,073, filed March 8, 1955, now United States Patent No. 2,912,419.

Having thus described our invention, what we claim is:

1. A process for the polymerization of a 1-alkene, which process comprises exposing said 1-alkene under polymerization conditions to a catalyst consisting essentially of a composition formed from a hydrocarbon aluminum compound and a pentavalent oxide of vanadium containing a minor proportion between about 1 and about 20 mole percent based on said oxide of vanadium, of at least one oxide of a metal selected from the group consisting of chromium, iron, cobalt, nickel and zirconium, the mixed oxide having been calcined at a temperature of about 500° C. in air for a period between about 2 and about 5 hours.

2. The process of claim 1 wherein said 1-alkene contains from 2 to 8 carbon atoms, inclusive, per molecule and is selected from the class consisting of ethylene, n-alkyl ethylenes and iso-alkyl ethylenes.

3. The process of claim 1 wherein said 1-alkene is a normal alkene containing 2 to 4 carbon atoms, inclusive, per molecule.

4. The process of claim 1 wherein said polymerization conditions include a polymerization temperature between about 0° C. and about 200° C.

5. A process for the preparation of a normally solid polymer, which process comprises exposing propylene under polymerization conditions to a catalyst consisting essentially of a composition formed from a hydrocarbon aluminum compound and a solid material comprising a minor proportion by weight of vanadium pentoxide supported upon a major proportion by weight of an inert solid support and between about 1 and about 20 mol per-ment, based on said oxide of vanadium, of at least one oxide of a metal selected from the group consisting of chromium, iron, cobalt, nickel and zirconium, the mixed oxide having been calcined at a temperature of about 500° C. in air for a period between about 2 and about 5 hours.

6. The process of claim 5 wherein said solid support comprises silica.

7. The process of claim 5 wherein said hydrocarbon aluminum compound is a trialkyl aluminum.

8. The process of claim 5 wherein said polymerization conditions include a suitable polymerization temperature between about 0° C. and about 200° C.

9. The process of claim 5 wherein said oxide is chromium oxide.

10. The process of claim 5 wherein said oxide is iron oxide.

11. The process of claim 5 wherein said oxide is cobalt oxide.

12. The process of claim 5 wherein said oxide is nickel oxide.

13. The process of claim 5 wherein said oxide is zirconium oxide.

14. A process for the preparation of a normally solid polymer, which process comprises exposing ethylene under polymerization conditions to a catalyst consisting essentially of a composition formed from a hydrocarbon aluminum compound and a solid material comprising a minor proportion by weight of vanadium pentoxide supported upon a major proportion by weight of an inert solid support and between about 1 and about 20 mol percent, based on said oxide of vanadium, of at least one oxide of a metal selected from the group consisting of chromium, iron, cobalt, nickel and zirconium, the mixed oxide having been calcined at a temperature of about 500° C. in air for a period between about 2 and about 5 hours.

15. The process of claim 14 wherein said polymerization conditions include a suitable polymerization temperature between about 0° C. and about 200° C.

16. A catalyst suitable for the polymerization of a 1-alkene, which catalyst consists essentially of a composition which is prepared by contacting a hydrocarbon aluminum compound with vanadium pentoxide containing a minor proportion between about 1 and about 20 mole percent based on said vanadium pentoxide, of at least one oxide of a metal selected from the group consisting of chromium, iron, cobalt, nickel and zirconium, the mixed oxide having been calcined at a temperature of about 500° C. in air for a period between about 2 and about 5 hours.

17. The catalyst of claim 16 wherein said oxide of vanadium is supported upon a major proportion by weight of a substantially inert solid support.

18. The process of claim 17 wherein said solid support consists essentially of a silica gel.

References Cited in the file of this patent

UNITED STATES PATENTS

| | | |
|---|---|---|
| 2,824,089 | Peters | Feb. 18, 1958 |
| 2,834,769 | Feller et al. | May 13, 1958 |
| 2,846,427 | Findlay | Aug. 5, 1958 |

FOREIGN PATENTS

| | | |
|---|---|---|
| 534,792 | Belgium | Jan. 31, 1955 |
| 545,857 | Belgium | Sept. 7, 1956 |